US012006959B2

United States Patent
Morelli Lopez (10) Patent No.: US 12,006,959 B2
(45) Date of Patent: Jun. 11, 2024

(54) TRANSLATING RETENTION CLIP

(71) Applicant: Aptiv Technologies AG, Schaffhausen (CH)

(72) Inventor: Roberto Morelli Lopez, Juarez (MX)

(73) Assignee: Aptiv Technologies AG, Schaffhausen (CH)

( * ) Notice: Subject to any disclaimer, the term of this patent is extended or adjusted under 35 U.S.C. 154(b) by 38 days.

(21) Appl. No.: 17/654,330

(22) Filed: Mar. 10, 2022

(65) Prior Publication Data
US 2023/0193933 A1    Jun. 22, 2023

Related U.S. Application Data

(60) Provisional application No. 63/265,500, filed on Dec. 16, 2021.

(51) Int. Cl.
*F16B 37/04* (2006.01)
*B60R 13/02* (2006.01)
*F16B 2/24* (2006.01)

(52) U.S. Cl.
CPC .......... *F16B 2/241* (2013.01); *B60R 13/0206* (2013.01); *Y10T 24/307* (2015.01)

(58) Field of Classification Search
CPC ...... F16B 2/241; F16B 37/043; Y10T 24/307; Y10T 24/304
See application file for complete search history.

(56) References Cited

U.S. PATENT DOCUMENTS

| 5,632,584 | A | * | 5/1997 | Acevedo | ............... | F16B 37/043 |
| | | | | | | 411/182 |
| 2005/0236861 | A1 | * | 10/2005 | Slobodecki | ........... | F16B 37/043 |
| | | | | | | 296/39.1 |
| 2007/0183864 | A1 | | 8/2007 | Shishikura | | |
| 2008/0086850 | A1 | * | 4/2008 | Smith | ................... | F16B 21/076 |
| | | | | | | 24/458 |

(Continued)

FOREIGN PATENT DOCUMENTS

FR    2799518 A1    4/2001

OTHER PUBLICATIONS

"Extended European Search Report", EP Application No. 22197978. 4, May 15, 2023, 7 pages.

*Primary Examiner* — Robert Sandy
*Assistant Examiner* — Michael S Lee
(74) *Attorney, Agent, or Firm* — Harness, Dickey & Pierce, P.L.C.

(57) ABSTRACT

A retention clip is described herein. The retention clip has a first portion configured to temporarily deform upon insertion into a slot of a mounting location and prevent the retention clip from retracting through the slot once inserted. The retention clip also has a second portion configured to attach the retention clip to a component via a first torque of a fastener interfacing with the second portion. The retention clip further has a third portion configured to abut against a surface of the component and deform under s second torque of the fastener such that the first portion and the second portion are translated along an attachment axis toward the component. The retention clip allows for locating and securing the component with a single fastener via two stages. Accordingly, mounting of the component may be cheaper, less complex, and quicker.

19 Claims, 5 Drawing Sheets

(56) References Cited

U.S. PATENT DOCUMENTS

2009/0169326 A1* 7/2009 Hullmann ............ F16B 37/043
  411/103
2011/0163562 A1* 7/2011 Smith ................ B60R 13/0206
  296/1.07

* cited by examiner

TRANSLATING RETENTION CLIP

CROSS-REFERENCE TO RELATED APPLICATION

This application claims the benefit of U.S. Provisional Patent Application No. 63/265,500, filed Dec. 16, 2021, the disclosure of which is hereby incorporated by reference in its entirety herein.

BACKGROUND

During vehicle production, many components are attached to vehicles. Different types of fasteners and connections are used depending upon the specific requirements of the components and their mounting. To decrease difficulty of assembly and production times, components are often located (e.g., staged) in a first step prior to fastening them to the vehicles in a second step. Determining how to best accomplish both tasks effectively and efficiently can be difficult due to packaging constraints, vehicle constraints, component constraints, accessibility of features/hardware, and other factors.

SUMMARY

This document is directed to a translating retention clip (hereinafter referred to as a retention clip). The retention clip may be configured for a vehicle environment (e.g., to mount a component to a vehicle).

The retention clip comprises a first portion configured to temporarily deform upon insertion into a slot of a mounting location and prevent the retention clip from retracting through the slot once inserted. The retention clip also comprises a second portion configured to attach the retention clip to a component. The retention clip further comprises a third portion configured to abut against a surface of the component and deform such that the first portion and the second portion are translated along an attachment axis toward the component. The attachment axis is approximately perpendicular to the surface of the component.

This summary introduces simplified concepts for a retention clip that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

A retention clip is described with reference to the following drawings that use some of the same numbers throughout to reference like or examples of like features and components.

DETAILED DESCRIPTION

Overview

Modern vehicles incorporate many components (e.g., body pieces, trim, modules, computers, or sensors such as cameras, radar, lidar, laser, and sonar sensors). For efficient production, such components are often located (e.g., staged) prior to subsequent fastening. For example, components often have retention clips to locate the components. Fasteners (e.g., screws or bolts) can then secure the components to the vehicles. One problem with using such techniques is that multiple fastening means are required (e.g., retention clips and separate screws). Furthermore, the components and the vehicles require attachment features for both types of hardware, thus, contributing to complexity and cost.

A retention clip is described herein. The retention clip has a first portion configured to temporarily deform upon insertion into a slot of a mounting location and prevent the retention clip from retracting through the slot once inserted. The retention clip also has a second portion configured to attach the retention clip to a component via a first torque of a fastener interfacing with the second portion. The retention clip further has a third portion configured to abut against a surface of the component and deform under s second torque of the fastener such that the first portion and the second portion are translated along an attachment axis toward the component. The described retention clip allows for locating and securing the component with a single fastener via two stages. Accordingly, component mounting is generally cheaper, less complex, and quicker.

Example Retention Clip

Figure 1:
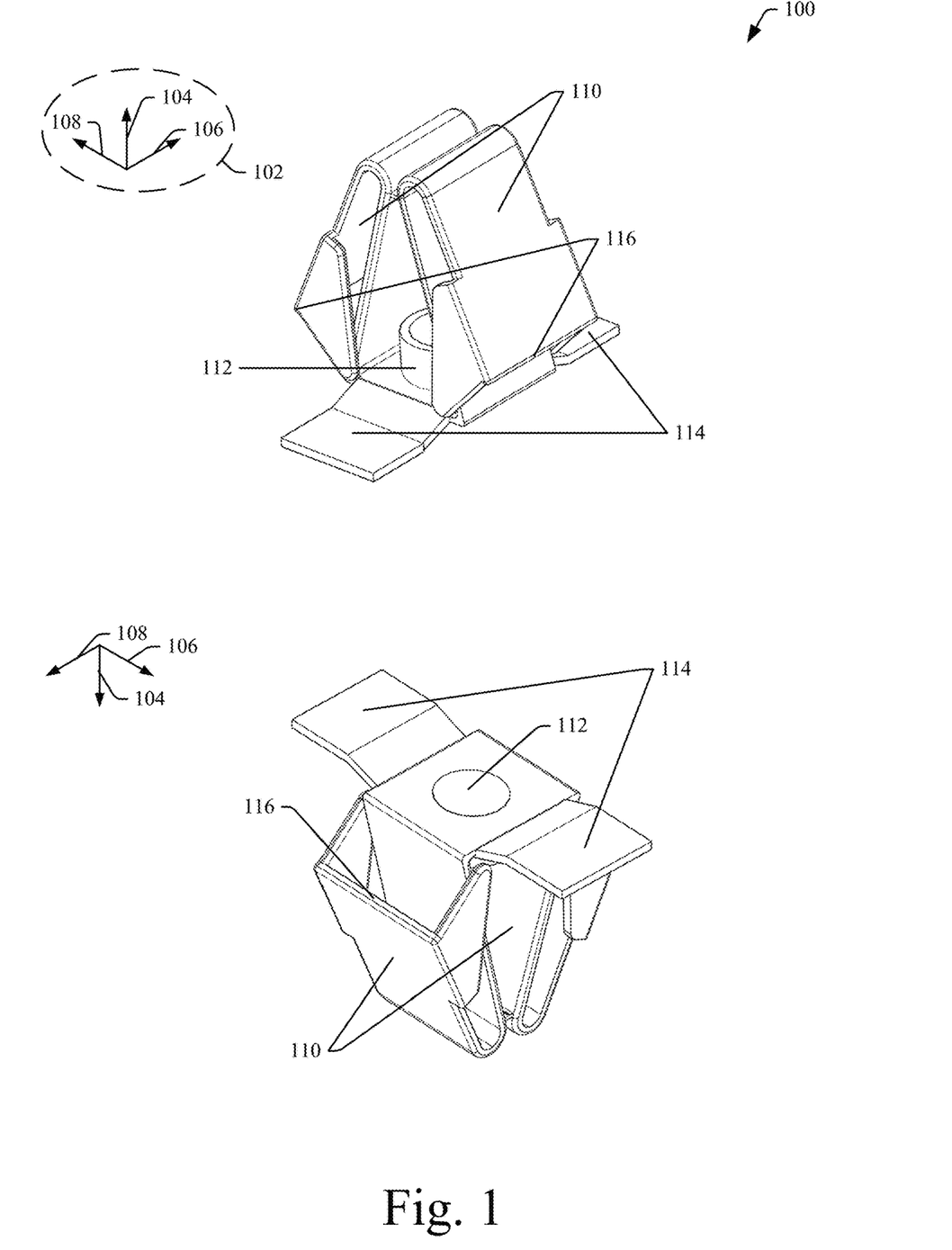
FIG. 1 illustrates an example retention clip in accordance with this disclosure.

FIG. 1 illustrates an example of a retention clip 100 in accordance with systems and techniques of this disclosure. FIG. 1 illustrates two views of the retention clip 100. The retention clip may be made of metal (e.g., formed of sheet metal, bent, and/or stamped) or plastic (e.g., molded, printed, formed). In some implementations, the retention clip 100 may be an assembly and/or made of a combination of materials (e.g., plastic and metal pieces). The retention clip 100 may vary in design, size, and/or shape compared to that illustrated without departing from the scope of this disclosure. For example, the features described below may be implemented in other designs of the retention clip 100 without changing the operation of the retention clip 100.

A coordinate system 102 is illustrated with an attachment axis 104, a left/right axis 106, and a front/back axis 108. The attachment axis 104 corresponds to an axis on which the retention clip 100 is inserted into a mounting location. In the illustrated example, the retention clip is symmetrical about two planes (e.g., a plane parallel to a plane formed by the attachment axis 104 and the left/right axis 106 and a plane parallel to a plane formed by the attachment axis 104 and the front/back axis 108). The retention clip 100 may be asymmetrical about either or both of those planes without departing from the scope of this disclosure. Furthermore, the left/right axis 106 and the front/back axis 108 may be switched without departing from the scope of this disclosure.

The retention clip 100 contains a first portion 110, a second portion 112, and a third portion 114. The first portion 110 is configured to temporarily deform upon insertion of the retention clip 100 into an opening of the mounting location along the attachment axis 104. For example, the first portion 110 may comprise front and back deformable wings that deform in the plane parallel to the attachment axis 104 and the front/back axis 108 upon insertion into a slot of the mounting location. The wings may have lead in surfaces that facilitate the deformation and may be connected to each other at an end opposite the third portion. Furthermore, the wings may be connected to each other at an end opposite the third portion 114. The first portion 110 may take shapes other than that illustrated without departing from the scope of this disclosure.

The second portion 112 is configured to attach the retention clip 100 to a component to be mounted at the mounting location. The second portion 112 may comprise a threaded hole, a clip configured to receive a threaded fastener, a thru hole configured to receive a self-tapping/self-threading fastener, a threaded rod, or the like.

The third portion 114 is configured to abut against the component in a first stage of the retention clip 100 and deform in a second stage of the retention clip 100 such that the first portion 110 and the second portion 112 are translated along the attachment axis 104 toward the component. The third portion 114 may comprise left and right deformable wings that deform in the plane parallel to the attachment axis 104 and the left/right axis 106. The deformation of the third portion 114 is described further below. The third portion 114 may take shapes other than that illustrated without departing from the scope of this disclosure.

To keep the retention clip 100 (and thus, the component) from pulling through mounting location upon translation, the first portion 110 may contain one or more holding surfaces 116. The holding surfaces 116 are configured to abut against a backside surface of the mounting location and provide a supporting surface against the translation, thereby allowing the component and the mounting location to be drawn together as the third portion 114 is deformed.

Accordingly, the retention clip 100 allows for locating and temporarily holding a component relative to a mounting location in a first stage and fastening the component to the mounting location in a second stage. In doing so, parts may be eliminated from an assembly, and fabrication of the component and mounting location may be simplified, thus improving cost, ease of assembly, and assembly times.

Example Assembly Stages

Figure 2:
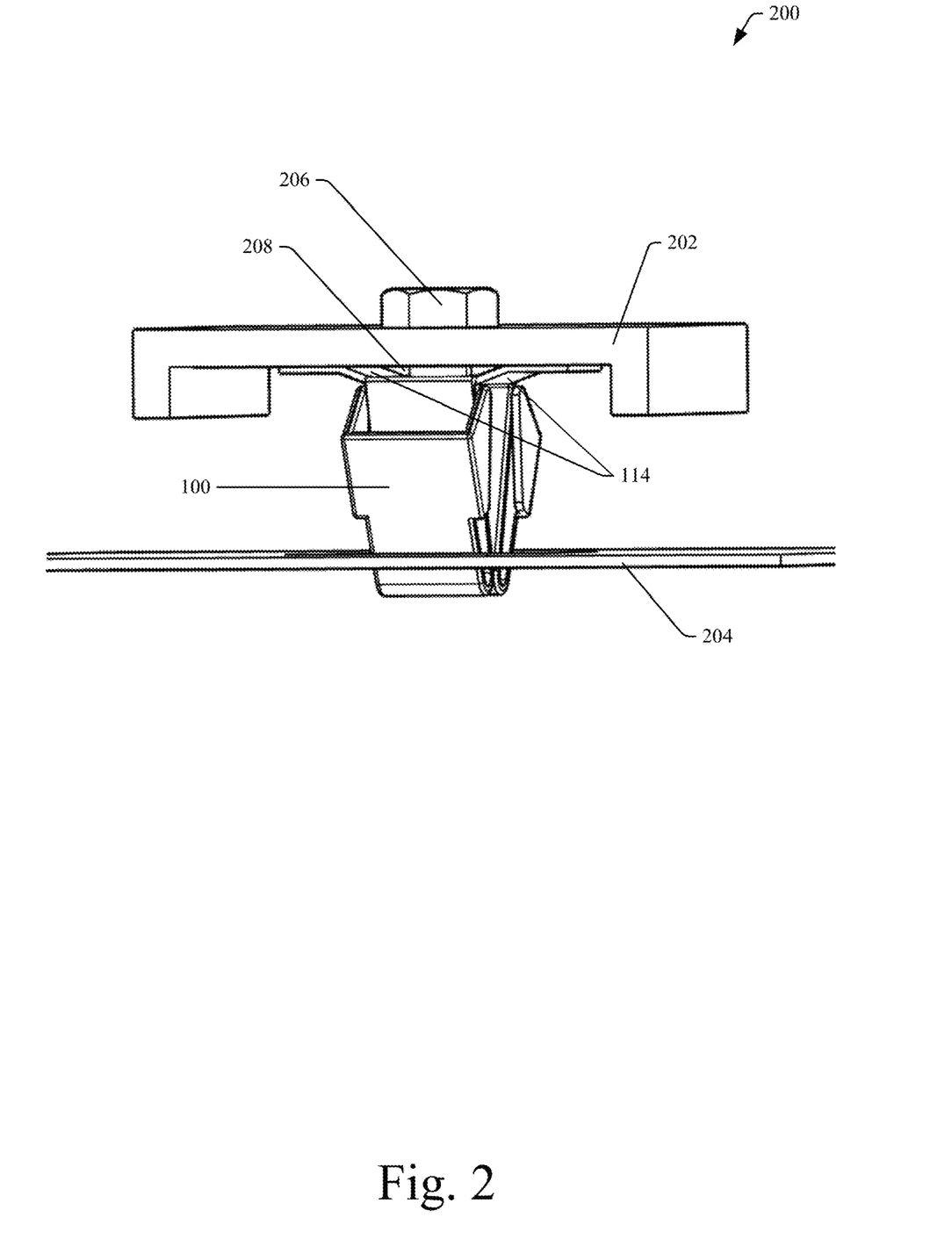
FIGS. 2-4 illustrate, in accordance with this disclosure, phases of assembly of a component to a mounting location using a retention clip in accordance with this disclosure.
Figure 3:
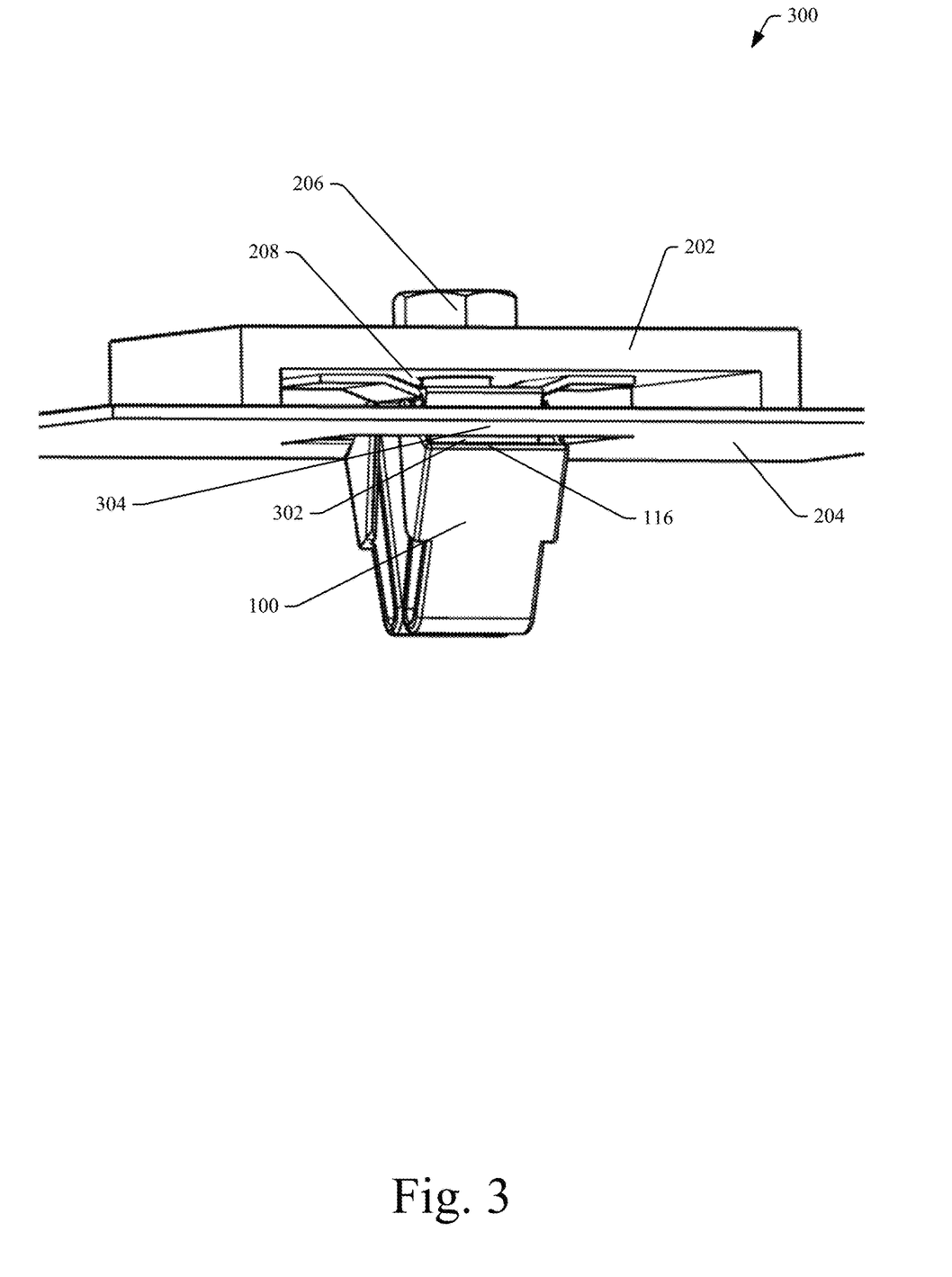
Figure 4:
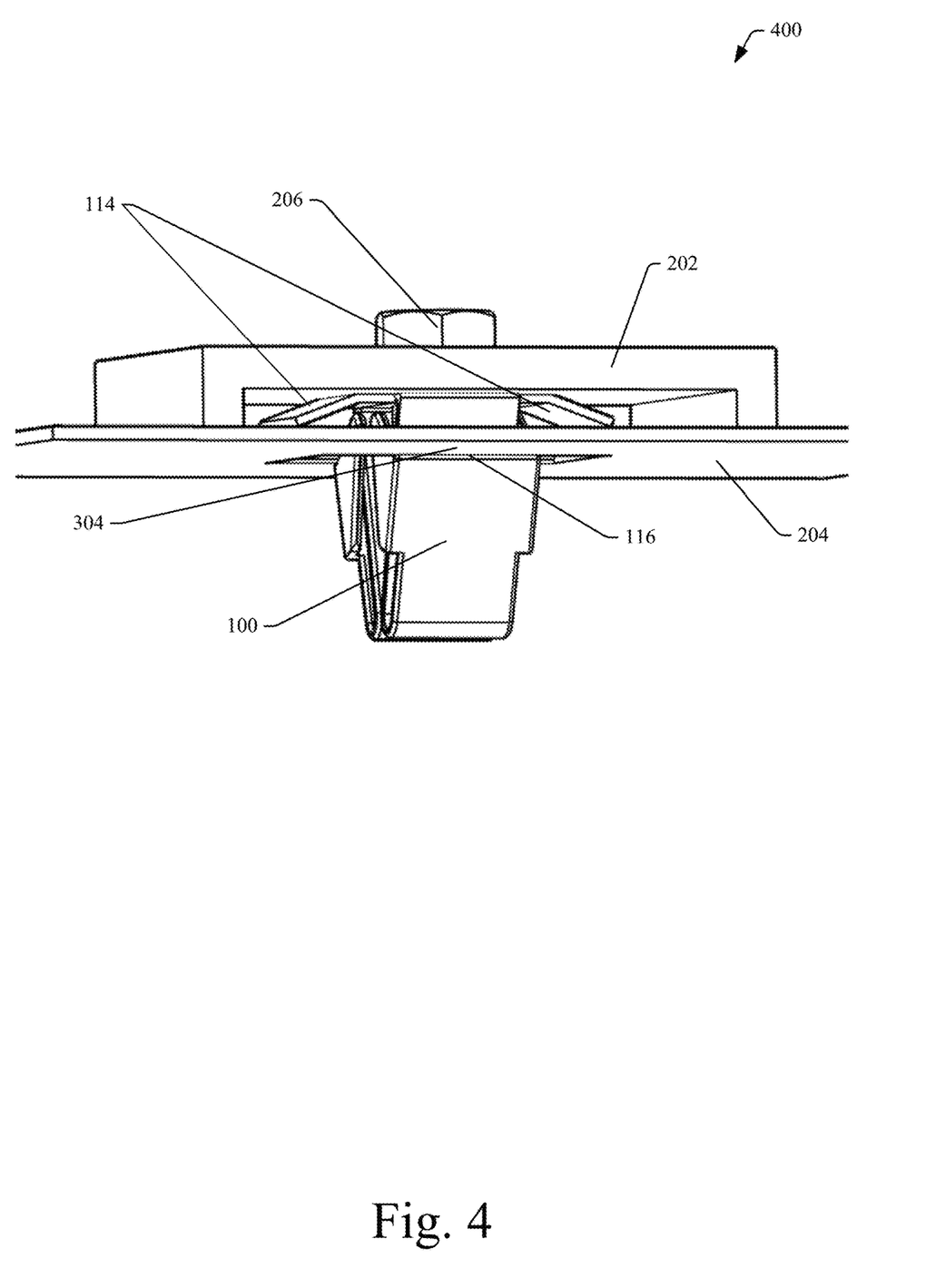

FIGS. 2-4 illustrate example phases the retention clip 100 may go through upon attachment of the component to the mounting location. FIG. 2 illustrates, at 200, the retention clip 100 attached to a component 202 to be attached to a mounting location 204. Although this disclosure is directed towards automotive applications, the component 202 and the mounting location 204 may be in any application or environment without departing from the scope of this disclosure. The component 202 may be a body piece, trim piece, module, computer, electrical component, fuse box, camera, radar sensor or radar module, lidar sensor or lidar module, sonar sensor or sonar module, laser sensor or laser module, other sensor or sensor module, or the like. The mounting location 204 may be a body panel, frame member, portion of a unibody, structural member, piece of sheet metal, another component, or the like.

The retention clip 100 is attached to the component 202 via a first torque of a fastener 206. The fastener 206 interfaces with the second portion 112 of the retention clip 100. The first torque draws the retention clip 100 toward the component 202 such that the third portion 114 abuts against the component without substantially deflecting or deforming. An offset 208 or gap exists between the second portion 112 and the component 202 in this stage.

The component 202 has an opening configured to receive the retention clip 100. The opening may be any shape or size depending on a configuration of the retention clip 100. In the illustrated example, the opening is a rectangular opening. The rectangular opening has a dimension that is smaller than a front/back width of the retention clip. The dimension causes edges of the opening to abut against the lead-in surfaces of the first portion 110, such that further insertion causes the first portion 110 to temporarily deform. FIG. 3 illustrates the retention clip 100 once it has been inserted through the opening.

FIG. 3 illustrates, at 300, the retention clip 100 inserted into the mounting location 204 (while attached to the component 202). The insertion is not illustrated, however, one of ordinary skill can appreciate a deformation of the first portion 110 upon entry through the mounting location 204. Once inserted, the first portion 110 may stay partially deformed based on a lead-out surface. The partial deformation may cause a weak clamping force between the mounting location 204 and the component 202. When inserted, there exists a gap 302 between the holding surfaces 116 and a backside 304 of the mounting location 204. The offset 208 may correspond to a maximum size of the gap 302.

FIG. 4 illustrates, at 400, the retention clip 100 after a second torque is applied to the fastener 206 (once inserted into the mounting location 204 per FIG. 3). The third portion 114 is configured to deform, thus allowing for the second portion 112 to be drawn up the fastener 206. Because the first portion 110 is connected to the second portion 112, the translation of the second portion 112 also causes the first portion 110 to be drawn up toward the mounting location 204. The first portion 110 may be drawn up toward the backside 304 of the mounting location 204 until the holding surfaces 116 are in contact with the backside 304. From there, building to the second torque causes the component 202 to be forced together with (e.g., clamped to) the mounting location 204. The retention clip 100 may allow for up to 1500N or more of clamping force between the mounting location 204 and the component 202.

Accordingly, the retention clip 100 provides for a staging operation where the component 202 is located relative to the mounting location 204 and for a clamping operation that removes the gap 302 and secures the component 202 to the mounting location 204 with a high clamping force. In doing so, a number of parts may be reduced (in type and/or number), thus allowing for reduced cost, complexity, and assembly time. Furthermore, designs of the component 202 and the mounting location 204 may be revised based on not requiring separate clips and fasteners.

Example Method

Figure 5:
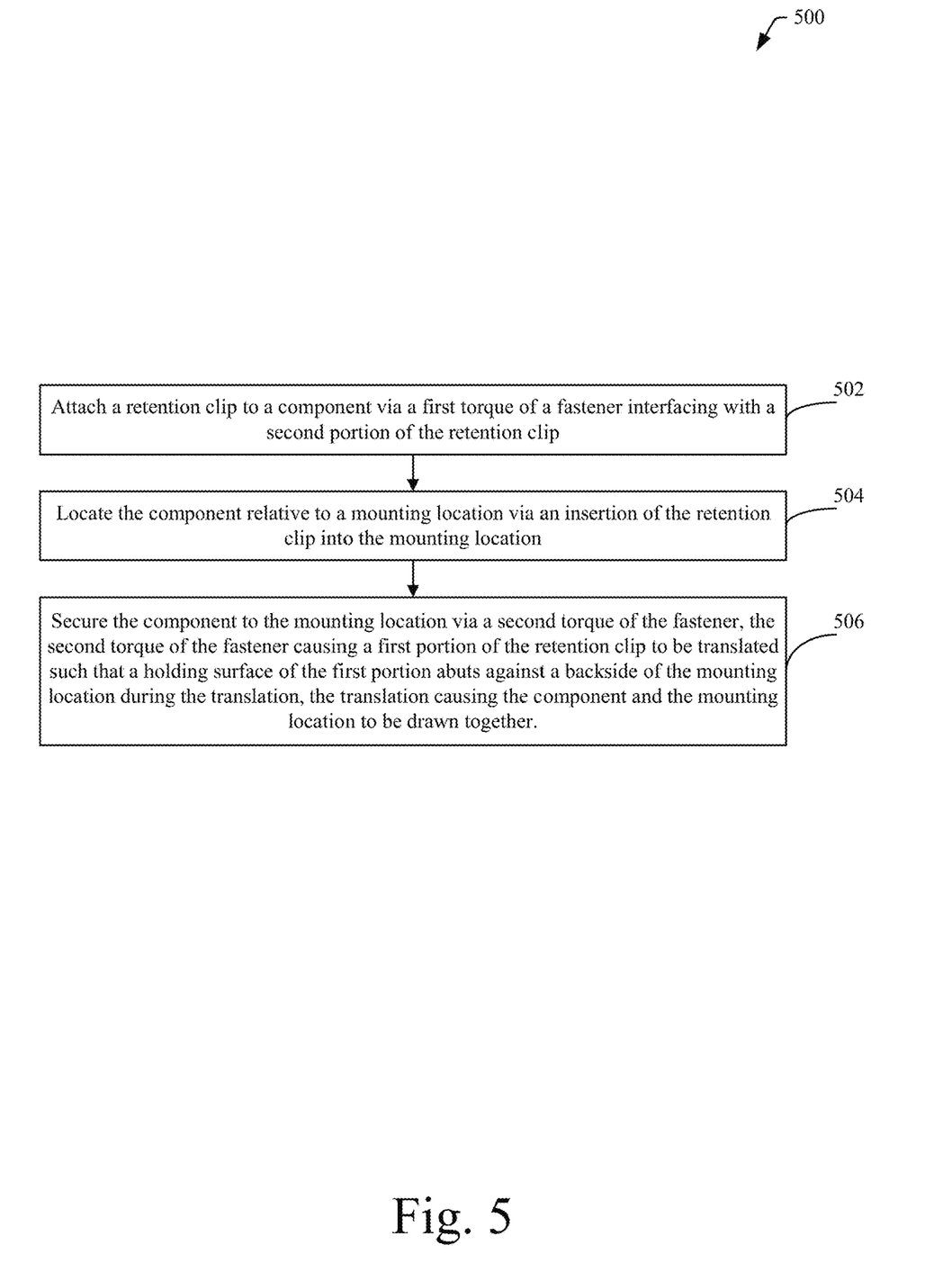
FIG. 5 illustrates an example method of assembly using a retention clip in accordance with this disclosure.

FIG. 5 illustrates an example method of assembly using a retention clip in accordance with this disclosure. At 502, a retention clip is attached to a component via a first torque of a fastener interfacing with a second portion of the retention clip. For example, the retention clip 100 may be attached to the component 202 via the first torque of the fastener 206 interfacing with the second portion 112.

At 504, the component is located relative to a mounting location via an insertion of the retention clip into the mounting location. For example, the component 202 may be located relative to the mounting location 204 via an insertion of the retention clip 100 (that is attached to the component 202) into the mounting location 204 (e.g., the slot). The insertion may cause the first portion 110 to compress upon entry into the mounting location 204. After insertion, the first portion 110 may exert a weak force that holds the component 202 to the mounting location 204. The weak force may be due to a spring action of the retention clip 100 trying to return to its uninserted shape.

At 506, the component is secured to the mounting location via a second torque of the fastener. The second torque of the fastener causes a first portion of the retention clip to be translated such that a holding surface of the first portion abuts against a backside of the mounting location during the translation. As part of the operation, the first portion may be partially pulled back through the mounting location until the holding surface of the first portion abuts against the backside of the mounting location. Once the holding surface is abutted against the backside of the mounting location, the second torque may then cause a clamping force between the mounting location and the component. For example, the component 202 may be secured to the mounting location 204 via the second torque of the fastener 206. The second torque of the fastener 206 may cause the first portion 110 of the retention clip 100 to be translated such that the holding surfaces 116 of the first portion 110 abut against a backside 304 of the mounting location 204. The second torque may then cause a clamping force between the mounting location 204 and the component 202.

EXAMPLES

Example 1: A retention clip comprising: a first portion configured to temporarily deform upon insertion into a slot of a mounting location and prevent the retention clip from retracting through the slot once inserted; a second portion configured to attach the retention clip to a component; and a third portion configured to: abut against a surface of the component; and deform such that the first portion and the second portion are translated along an attachment axis toward the component, the attachment axis being approximately perpendicular to the surface of the component.

Example 2: The retention clip of example 1, wherein the second portion is configured to mate with a threaded component.

Example 3: The retention clip of example 2, wherein the retention clip is configured to: attach to the component via a first torque of the threaded component without deforming the third portion; and deform the third portion via a second torque of the threaded component while the retention clip is attached to the component.

Example 4: The retention clip of any preceding example, wherein the third portion comprises the second portion.

Example 5: The retention clip of any preceding example, wherein the third portion comprises a plate-like structure with deformation wings on proximal ends.

Example 6: The retention clip of example 5, wherein the deformation wings extend substantially along an axis that is perpendicular to a direction of temporary deformation of the first portion.

Example 7: The retention clip of example 5 or 6, wherein the deformation wings are initially bent such that the second portion is offset from the surface of the component when the retention clip is attached to the component.

Example 8: The retention clip of any of examples 5 to 7, wherein the deformation of the third portion comprises the deformation wings bending towards flush with the surface of the component.

Example 9: The retention clip of example 7 or 8, wherein an amount of the offset corresponds to an amount of travel of the first portion along the attachment axis.

Example 10: The retention clip of any preceding example, wherein the translation of the first portion along the attachment axis causes a holding surface of the first portion to abut against a surface of the mounting location that is opposite the component.

Example 11: The retention clip of example 10, wherein the holding surface is a ledge.

Example 12: The retention clip of any of examples 9 to 11, wherein the amount of travel corresponds to a maximum gap between the holding surface of the first portion and the surface of the mounting location opposite the component when the component is attached to the mounting location.

Example 13: The retention clip of any preceding example, wherein the deformation of the third portion does not cause a deformation of the first portion.

Example 14: The retention clip of any preceding example, wherein the first portion is attached to the third portion and extends along the attachment axis.

Example 15: The retention clip of any preceding example, wherein: the component is an automotive radar component; and the mounting location is a portion of sheet metal of a vehicle.

Example 16: The retention clip of any preceding example, wherein the retention clip is made of metal.

Example 17: The retention clip of example 16, wherein the retention clip is formed of sheet metal.

Example 18: The retention clip of any preceding example, wherein the retention clip is made of plastic.

Example 19: The retention clip of any preceding example, wherein the retention clip is configured to provide a clamping force between the mounting location and the component along the attachment axis.

Example 20: The retention clip of example 19, wherein the clamping force is at least 1500 Newtons.

Example 21: A method comprising: attaching a retention clip to a component via a first torque of a fastener interfacing with a second portion of the retention clip; and locating the component relative to a mounting location via an insertion of the retention clip into the mounting location; and securing the component to the mounting location via a second torque of the fastener, the second torque of the fastener causing: a first portion of the retention clip to be translated such that a holding surface of the first portion abuts against a backside of the mounting location during the translation; and once the holding surface abuts against the backside of the mounting location, a clamping force between the mounting location and the component.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A retention clip comprising:
   a first portion configured to temporarily deform upon insertion into a slot of a mounting location and prevent the retention clip from retracting through the slot once inserted;
   a second portion configured to attach the retention clip to a component; and
   a third portion comprising a plate-like structure with deformation wings on proximal ends, the deformation wings configured to:
   abut against a surface of the component that is towards the mounting location;
   be initially bent at an acute angle such that the second portion is offset from the surface of the component; and
   deform to allow the first portion and the second portion to be translated along an attachment axis toward the surface of the component, the attachment axis being approximately perpendicular to the surface of the component;
   wherein the deformation of the third portion includes the deformation wings bending towards flush with the surface of the component.

2. The retention clip of claim 1, wherein the second portion is configured to mate with a threaded component.

3. The retention clip of claim 2, wherein the retention clip is configured to:
   attach to the component via a first torque of the threaded component without deforming the third portion; and
   deform the third portion via a second torque of the threaded component while the retention clip is attached to the component.

4. The retention clip of claim 1, wherein the third portion comprises the second portion.

5. The retention clip of claim 1, wherein the deformation wings extend substantially along an axis that is perpendicular to a direction of temporary deformation of the first portion.

6. The retention clip of claim 1, wherein an amount of the offset corresponds to an amount of travel of the first portion along the attachment axis.

7. The retention clip of claim 6, wherein the translation of the first portion along the attachment axis causes a holding surface of the first portion to abut against a surface of the mounting location that is opposite the component.

8. The retention clip of claim 7, wherein the holding surface is a ledge.

9. The retention clip of claim 7, wherein the amount of travel corresponds to a maximum gap between the holding surface of the first portion and the surface of the mounting location opposite the component when the component is attached to the mounting location.

10. The retention clip of claim 8, wherein the ledge spans an entire width of the first portion.

11. The retention clip of claim 1, wherein the deformation of the third portion does not cause a deformation of the first portion.

12. The retention clip of claim 1, wherein the first portion is attached to the third portion and extends along the attachment axis.

13. The retention clip of claim 1, wherein:
    the component is an automotive radar component; and
    the mounting location is a portion of sheet metal of a vehicle.

14. The retention clip of claim 1, wherein the retention clip is made of metal.

15. The retention clip of claim 14, wherein the retention clip is formed of sheet metal.

16. The retention clip of claim 1, wherein the retention clip is made of plastic.

17. The retention clip of claim 1, wherein the retention clip is configured to provide a clamping force between the mounting location and the component along the attachment axis.

18. The retention clip of claim 17, wherein the clamping force is at least 1500 Newtons.

19. The retention clip of claim 1, wherein the acute angle is less than 45 degrees.

* * * * *